United States Patent
Fuse

(10) Patent No.: US 7,419,432 B2
(45) Date of Patent: Sep. 2, 2008

(54) COUPLING JOINT STRUCTURE OF SMALL-SIZED BOAT

(75) Inventor: Tomohiro Fuse, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 11/370,847

(22) Filed: Mar. 9, 2006

(65) Prior Publication Data

US 2006/0205293 A1    Sep. 14, 2006

(30) Foreign Application Priority Data

Mar. 11, 2005    (JP) .............................. 2005-069246

(51) Int. Cl.
*F16D 3/74*    (2006.01)
(52) U.S. Cl. .......................................... 464/73; 440/83
(58) Field of Classification Search .................. 464/73, 464/75, 76, 93; 440/83
See application file for complete search history.

(56) References Cited

U.S. PATENT DOCUMENTS 3,901,047 A * 8/1975 Pletsch et al. .................. 464/93
4,413,980 A * 11/1983 Walloch .................... 464/76 X
6,659,819 B2 * 12/2003 Fuse ........................... 440/83

FOREIGN PATENT DOCUMENTS

JP    2000-255492 A    9/2000

* cited by examiner

*Primary Examiner*—Greg Binda
(74) *Attorney, Agent, or Firm*—Birch, Stewart, Kolasch & Birch, LLP

(57) ABSTRACT

A coupling joint structure for a boat where the output of an engine can be securely transmitted to a propeller shaft and centrifugal force can be reduced. The structure includes a first coupler on the driving side to an output shaft, a second coupler on the driven side to a propeller shaft, and a damper member interposed between the second coupler on the driven side and the first coupler on the driving side. The first coupler on the driving side and the second coupler on the driven side each include pawl pieces. In a first curved part of each of the pawl pieces on the driving side, the base (wall thickness t1) is made thicker than the end (wall thickness t2). In a second curved part of each of the pawl pieces on the driven side, the base (wall thickness t1) is made thicker than the end (wall thickness t2).

21 Claims, 7 Drawing Sheets

COUPLING JOINT STRUCTURE OF SMALL-SIZED BOAT

CROSS-REFERENCE TO RELATED APPLICATION

The present application claims priority under 35 U.S.C. §119 to Japanese Patent Application No. 2005-069246, filed Mar. 11, 2005, the entire contents of which are hereby incorporated by reference.

BACKGROUND OF THE INVENTION

1. Field of the Invention

The present invention relates to coupling joint structure of a small-sized boat where respective couplers are provided to an output shaft and a propeller shaft, a damper member is interposed between each coupler and the revolution of the output shaft is transmitted to the propeller shaft via the damper member.

2. Description of Background Art

A small-sized boat is provided in which an engine is mounted in the body of the boat, a water jet pump is provided at the back of the engine and an output shaft of the engine is coupled to a propeller shaft of the water jet pump via a coupling.

The revolution of the output shaft is transmitted to the propeller shaft via the coupling by revolving the engine, water is sucked from the bottom of the boat by driving the water jet pump, the sucked water is jetted backward, and the boat is glided (for example, refer to JP-A No. 255492/2000).

Referring to FIG. 7, JP-A No. 255492/2000 will be described below.

FIG. 7 is an explanatory drawing for explaining conventional type basic configuration.

A coupling joint 100 is provided with a coupler 103 on the driving side to an output shaft 102 of an engine 101 and a coupler 105 on the driven side to a propeller shaft 104 of a propeller, pawl pieces 107 - - - ( - - - denotes plural pieces) on the driving side are extended from the body 106 of the coupler 103 on the driving side toward the rear of the boat, pawl pieces 109 - - - on the driven side are extended from the body 108 of the coupler 105 on the driven side toward the front of the boat, and a damper member 111 is interposed between the pawl pieces 107 - - - on the driving side and the pawl pieces 109 - - - on the driven side.

The revolution of the output shaft 102 is transmitted to the damper member 111 via the coupler 103 on the driving side by revolving the engine 101 and the revolution of the engine 101 is transmitted to the propeller shaft 104 by transmitting the revolution of the damper member 111 to the coupler 105 on the driven side.

The revolution of the output shaft 102 is transmitted to the damper member 111 via the pawl pieces 107 - - - on the driving side of the coupler 103 on the driving side and is transmitted to the pawl pieces 109 - - - on the driven side of the coupler 105 on the driven side via the damper member 111.

To securely transmit large torque from the output shaft 102 to the propeller shaft 104, each sectional shape of the pawl pieces 107 - - - on the driving side and the pawl pieces 109 - - - on the driven side is enlarged and the strength is required to be secured.

However, when each sectional shape of the pawl pieces 107 - - - on the driving side and the pawl pieces 109 - - - on the driven side is enlarged, the weight of each pawl piece 107 - - - , 109 - - - increases.

When the weight of each pawl piece 107 - - - , 109 - - - increases, the centrifugal force of the pawl pieces 107 - - - on the driving side and the pawl pieces 109 - - - on the driven side increases when the coupling joint 100 is revolved.

Therefore, it is difficult to secure the durability of the pawl pieces 107 - - - , 109 - - - with centrifugal force.

SUMMARY AND OBJECTS OF THE INVENTION

The object of the invention is to provide coupling joint structure of a small-sized boat where the output of an engine can be securely transmitted to a propeller shaft and centrifugal force can be reduced.

According to a first aspect of the present invention, a coupling joint structure is provided for a small-sized boat. The revolution of an engine is transmitted to a propeller shaft by mounting the engine in the body of the small-sized boat, providing a propeller at the back of the engine, providing a coupler on the driving side to an output shaft of the engine, providing a coupler on the driven side to the propeller shaft of the propeller, extending pawl pieces on the driving side from the body of the coupler on the driving side toward the rear of the boat, extending pawl pieces on the driven side from the body of the coupler on the driven side toward the front of the boat, interposing a damper member between the pawl pieces on the driving side and the pawl pieces on the driven side, transmitting the revolution of the engine to the damper member via the pawl pieces on the driving side and transmitting the revolution of the damper member to the pawl pieces on the driven side. The pawl piece on the driving side is provided with a wall thickness part on the driving side in which a wall thickness of the base is made thicker than that of the end. Further, the pawl piece on the driven side is provided with a wall thickness part on the driven side in which a wall thickness of the base is made thicker than that of the end.

The pawl piece on the driving side is a cantilever supporting member the base of which is supported by the body of the coupler and the end of which is a free end. Similarly, the pawl piece on the driven side is a cantilever supporting member the base of which is supported by the body of the coupler and the end of which is a free end.

Therefore, when the revolution of the output shaft is transmitted to the propeller shaft, a load applied to the pawl piece on the driving side and the pawl piece on the driven side is supported by each base.

Then, a wall thickness of the base of the pawl piece on the driving side is made thicker than that of the end and a wall thickness of the base of the pawl piece on the driven side is made thicker than that of the end.

Hereby, when the revolution of the engine is transmitted to the propeller shaft, a load applied to the pawl piece on the driving side and the pawl piece on the driven side can be securely supported by the respective pawl pieces.

Further, as the respective wall thicknesses of those bases of the pawl piece on the driving side and the pawl piece on the driven side have only to be made thicker than those of the respective ends, the weight of the pawl piece on the driving side and the pawl piece on the driven side hardly increases.

Hereby, when the revolution of the engine is transmitted to the propeller shaft, the centrifugal force of the pawl piece on the driving side and the pawl piece on the driven side can be reduced.

According to a second aspect of the present invention, the wall thickness part on the driving side and the wall thickness part on the driven side are provided in locations in which no damper member is provided.

The wall thickness part on the driving side and the wall thickness part on the driven side are provided in the locations in which no damper member is provided. Therefore, the shape of the damper member is not required to be miniaturized to avoid the wall thickness part on the driving side and the wall thickness part on the driven side.

Hereby, the rigidity of the damper member can be secured to the same extent as that of the conventional type and the revolution of the engine can be securely transmitted to the propeller shaft.

As a result of first aspect of the present invention, the output of the engine can be securely transmitted to the propeller shaft by securely supporting a load applied to the pawl piece on the driving side and the pawl piece on the driven side by the respective pawl pieces.

The first aspect of the present invention also has an advantage that the durability of the pawl piece on the driving side and the pawl piece on the driven side with centrifugal force can be easily secured by reducing the centrifugal force of the pawl piece on the driving side and the pawl piece on the driven side.

According to the second aspect of the present invention, the revolution of the engine can be securely transmitted to the propeller shaft by securing the rigidity of the damper member to the same extent as that of the conventional type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the attached drawings, a best embodiment for embodying the invention will be described below. A forward direction, a backward direction, a leftward direction and a rightward direction denote a direction viewed from a rider, Fr denotes the front side, Rr denotes the rear side, L denotes the left side, and R denotes the right side.

Figure 1:
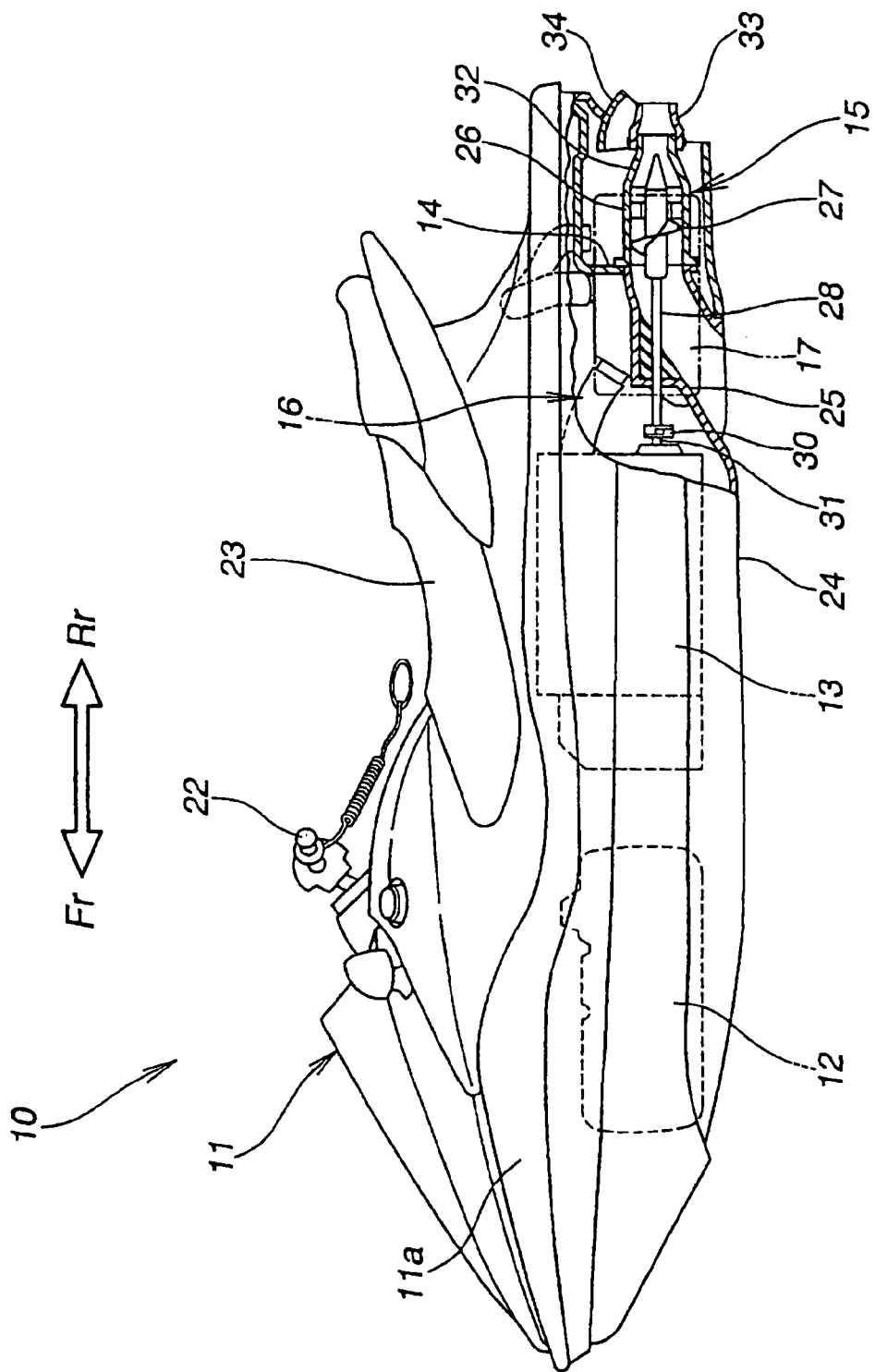
FIG. 1 is a side view showing a small-sized boat provided with coupling joint structure according to the invention.

FIG. 1 is a side view showing a small-sized boat provided with coupling joint structure according to the invention.

The small-sized boat 10 is a water jet propulsion boat which is provided with a fuel tank 12 in the front 11a of the body 11, which is provided with an engine 13 at the back of the fuel tank 12, which is provided with a pump case 14 at the back of the engine 13, which is provided with a water jet pump 15 in the pump case 14, in which the water jet pump (a propeller) 15 is coupled to the engine 13 using coupling joint structure 30, an inlet of an exhaust pipe 16 is attached to the engine 13 and an outlet of the exhaust pipe 16 is placed in the pump case 14, which is provided with a water muffler 17 on the way of the exhaust pipe 16 and which is provided with a steering handlebars 22 attached over the fuel tank 12 and a seat 23 attached at the back of the steering handlebars 22.

As for the water jet pump 15, its housing 26 is extended backward from a suction opening 25 at the bottom 24 of the boat, an impeller 27 is attached in the housing 26 so that the impeller can be turned, and a propeller shaft 28 is provided to the impeller 27.

The propeller shaft 28 is coupled to an output shaft 31 of the engine 13 via the coupling joint structure 30.

According to the water jet pump 15, water sucked from the suction opening 25 at the bottom 24 is jetted at the back of the body 11 from a steering nozzle 33 via a rear nozzle 32 of the housing 26 by driving the engine 13 and turning the impeller 27.

Hereby, the small-sized boat 10 is propelled (glided) forward.

When the small-sized boat 10 is backed, a reverse bucket 34 over the steering nozzle 33 is moved to a position of reverse travel at the back of the steering nozzle 33.

Hereby, water jetted backward from the steering nozzle 33 is led toward the front of the body 11 by the reverse bucket 34 and the small-sized boat 10 is backed by the led jetted water.

Figure 2:
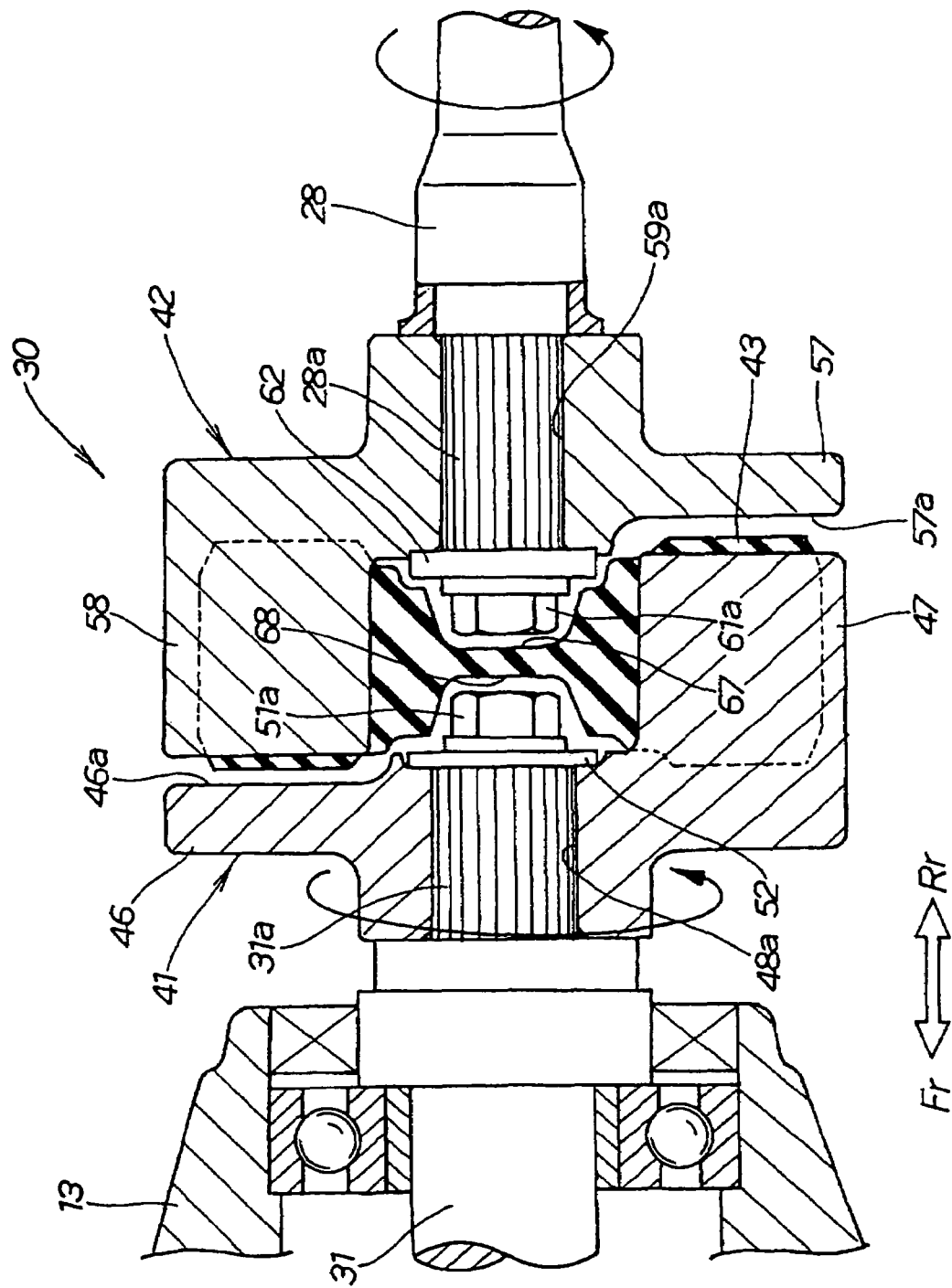
FIG. 2 is a sectional view showing the coupling joint structure of the small-sized boat according to the invention.

FIG. 2 is a sectional view showing the coupling joint structure of the small-sized boat according to the invention.

The coupling joint structure 30 is provided with a coupler 41 on the driving side to the output shaft 31 of the engine 13, a coupler 42 on the driven side to the propeller shaft 28 of the water jet pump 15 shown in FIG. 1, and a damper member 43 interposed between the coupler 42 on the driven side and the coupler 41 on the driving side.

Figure 3:
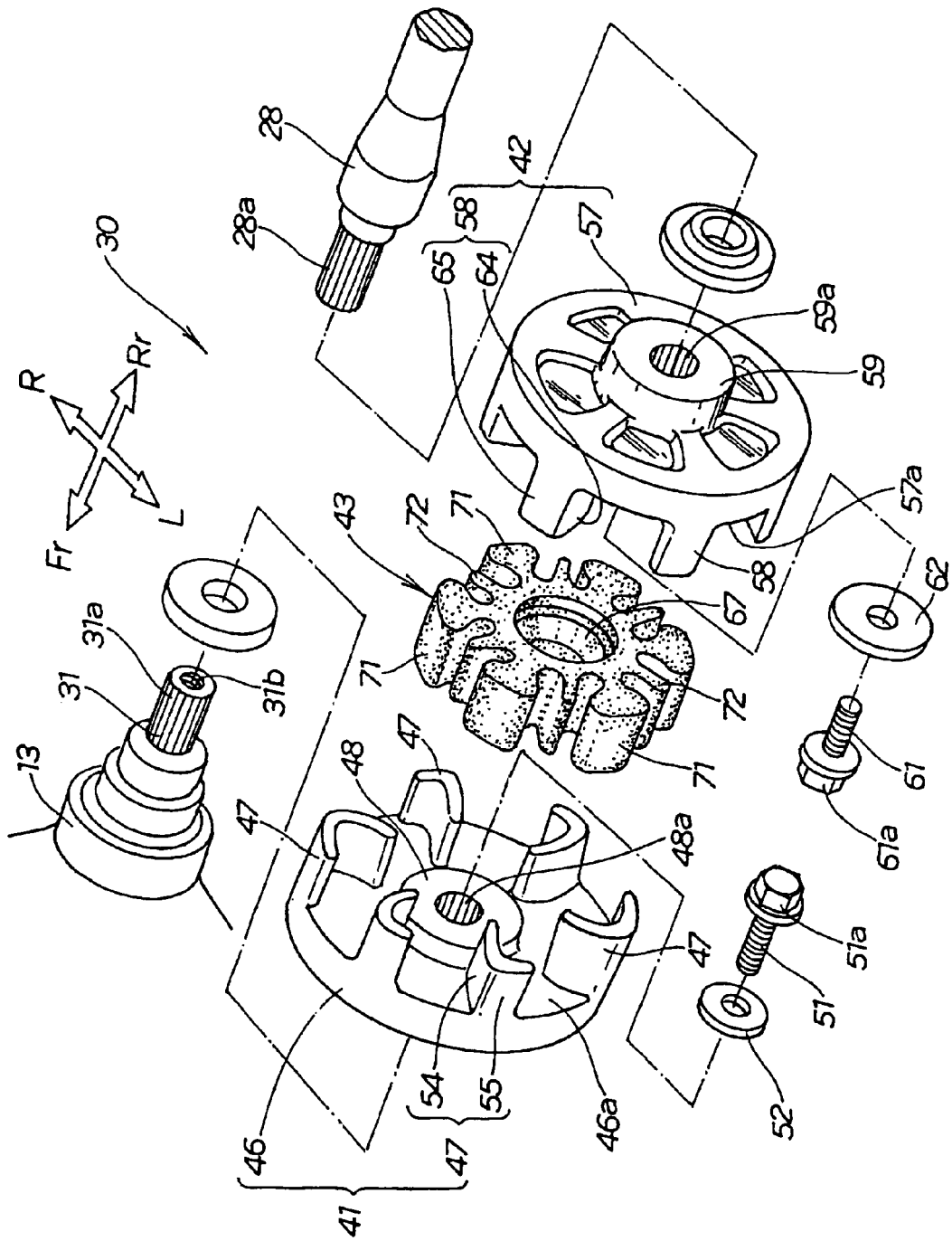
FIG. 3 is an exploded perspective view showing the coupling joint structure of the small-sized boat according to the invention.

FIG. 3 is an exploded perspective view showing the coupling joint structure of the small-sized boat according to the invention.

As for the coupler 41 on the driving side, pawl pieces 47 - - - on the driving side are extended from the disc-like coupler body 46 on the driving side toward the rear of the body.

The coupler body 46 on the driving side is provided with a boss 48 in the center and a female spline 48a is formed on the boss 48. A male spline 31a of the output shaft 31 is engaged with the female spline 48a.

A stopper member 52 is pressed on the end of the output shaft 31 and a spot facing of the coupler body 46 on the driving side by forming a tapped hole 31b at the end of the output shaft 31 and screwing a fixing bolt 51 onto the tapped hole 31b.

Hereby, as shown in FIG. 2, the coupler 41 on the driving side is fixed to the output shaft 31 by the fixing bolt 51.

The six pawl pieces 47 on the driving side are provided to a rear face 46a of the coupler body 46 on the driving side at an equal interval in a circumferential direction.

Figure 4:
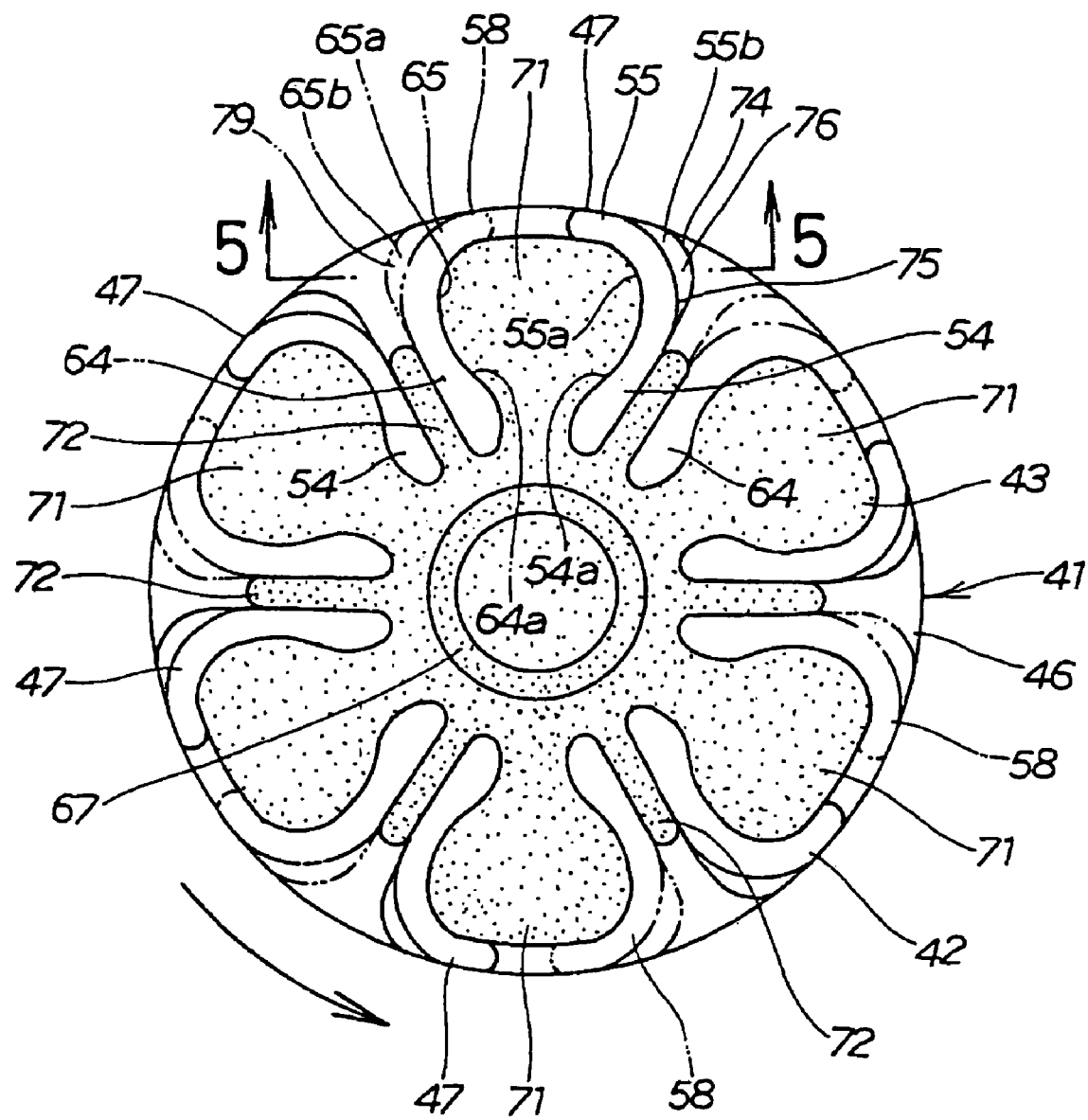
FIG. 4 is a front view showing the coupling joint structure of the small-sized boat according to the invention.

The pawl piece 47 on the driving side is provided with a radially extended first base 54 and a first curved part 55 curved clockwise from the outside end of the first base 54 (see FIG. 4, also).

As for the coupler 42 on the driven side, pawl pieces 58 - - - - on the driven side are extended from the disc-like coupler body 57 on the driven side toward the front of the boat.

The coupler body 57 on the driven side is provided with a boss 59 in the center and a female spline 59a is formed on the boss 59. A male spline 28a of the propeller shaft 28 is engaged with the female spline 59a.

A stopper member 62 is pressed on the end of the propeller shaft 28 and a spot facing of the coupler body 57 on the driven side by forming a tapped hole (not shown) at the end of the propeller shaft 28 and screwing a fixing bolt 61 onto the tapped hole.

Hereby, as shown in FIG. 2, the coupler 42 on the driven side is fixed to the propeller shaft 28 by the fixing bolt 61.

The six pawl pieces 58 on the driven side are provided to a front face 57a of the coupler body 57 on the driven side at an equal interval in a circumferential direction.

The pawl piece 58 on the driven side is provided with a radially extended second base 64 and a second curved part 65 curved counterclockwise from the outside end of the second base 64 (see FIG. 4, too).

The damper member 43 is arranged between the coupler 41 on the driving side and the coupler 42 on the driven side.

As for the damper member 43, a front recessed portion 68 (see FIG. 2) is formed in the front center, a rear recessed portion 67 is formed in the rear center, six power transmitting parts 71 - - - are formed on the periphery at an equal interval, and each of six partitions 72 - - - to be radially extended is formed between the power transmitting parts 71 - - - .

A head 51a of the fixing bolt 51 is housed in the front recessed portion 68 (see FIG. 2). A head 61a of the fixing bolt 61 is housed in the rear recessed portion 67.

FIG. 4 is a front view showing the coupling joint structure of the small-sized boat according to the invention. The pawl piece 47 on the driving side is shown by a full line and the pawl piece 58 on the driven side is shown by an imaginary line.

The power transmitting part 71 is arranged between the pawl piece 47 on the driving side and the pawl piece 58 on the driven side and the partition 72 is arranged between the first base 54 and the second base 64.

When the engine 13 (see FIG. 1) is driven and the output shaft 31 is revolved in a direction shown by an arrow as shown in FIG. 2, the revolution of the output shaft 31 is transmitted to the coupler 41 on the driving side.

The coupler 41 on the driving side is revolved in the direction shown by the arrow and the revolution of the coupler 41 on the driving side is transmitted to the power transmitting parts 71 - - - via the pawl pieces 47 - - - on the driving side.

The revolution transmitted to the power transmitting parts 71 - - - is transmitted to the second pawl pieces 58 - - - and the coupler 42 on the driven side (see FIG. 2) is revolved.

When the coupler 42 on the driven side is revolved, the propeller shaft 28 shown in FIG. 2 is revolved in a direction shown by an arrow integrally with the coupler 42 on the driven side.

As for the pawl piece 47 on the driving side, respective inner walls 54a, 55a of the first base 54 and the first curved part 55 are touched to the power transmitting part 71 and an outer wall 55b of the first curved part 55 is tapered.

Further, as for the pawl piece 58 on the driven side, respective inner walls 64a, 65a of the second base 64 and the second curved part 65 are touched to the power transmitting part 71 and an outer wall 65b of the second curved part 65 is tapered.

Figure 5:
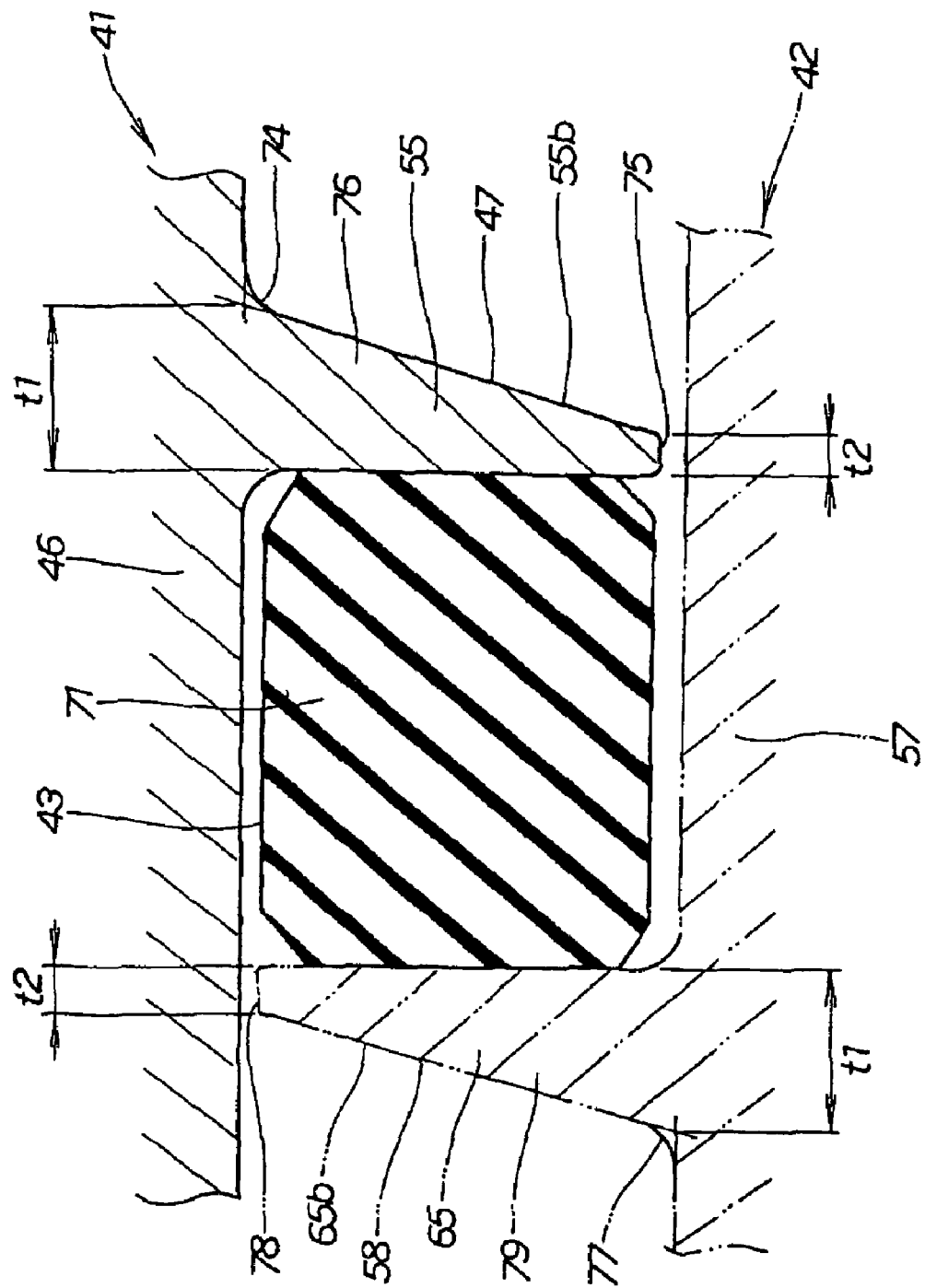
FIG. 5 is a sectional view viewed along a line 5-5 shown in FIG. 4.

FIG. 5 is a sectional view viewed along a line 5-5 shown in FIG. 4.

As for the pawl piece 47 on the driving side, a wall thickness t1 of the base 74 is made thicker than a wall thickness t2 of the end 75 by tapering the outer wall 55b of the first curved part 55 from its base 74 to the end 75.

Hereby, a wall thickness part 76 on the driving side is provided on the side of the outer wall 55b of the first curved part 55.

As for the pawl piece 58 on the driven side, a wall thickness t1 of the base 77 is made thicker than a wall thickness t2 of the end 78 by tapering the outer wall 65b of the second curved part 65 from its base 77 to the end 78.

Hereby, a wall thickness part 79 on the driven side is provided on the side of the outer wall 65b of the second curved part 65.

The pawl piece 47 on the driving side is a cantilever supporting member the base 74 of which is supported by the coupler body 46 on the driving side and the end 75 of which is a free end.

Similarly, the pawl piece 58 on the driven side is a cantilever supporting member the base 77 of which is supported by the coupler body 57 on the driven side and the end 78 of which is a free end.

Therefore, when the revolution of the output shaft 31 shown in FIG. 2 is transmitted to the propeller shaft 28, a load applied to the pawl piece 47 on the driving side and the pawl piece 58 on the driven side is supported by the bases 74, 77.

Then, the outer wall 55b of the first curved part 55 in the pawl piece 47 on the driving side is tapered so that the wall thickness is gradually increased from the end 75 to the base 74.

Similarly, the outer wall 65b of the second curved part 65 in the pawl piece 58 on the driven side is tapered so that the wall thickness is gradually increased from the end 78 to the base 77.

That is, the base 74 (wall thickness t1) of the pawl piece 47 on the driving side is made thicker than the end 75 (wall thickness t2) and further, the base 77 (wall thickness t1) of the pawl piece 58 on the driven side is made thicker than the end 78 (wall thickness t2).

Hereby, when the revolution of the engine 12 shown in FIG. 2 is transmitted to the propeller shaft 28, a load applied to the pawl piece 47 on the driving side 47 and the pawl piece 58 on the driven side can be securely supported by the pawl pieces 47, 58.

Further, as the bases 74, 77 (wall thickness t1) of the pawl piece 47 on the driving side and the pawl piece 58 on the driven side have only to be made thicker than the respective ends 75, 78, the weight of the pawl piece 47 on the driving side and the pawl piece 58 on the driven side hardly increases.

Hereby, when the revolution of the engine 13 is transmitted to the propeller shaft 28, the centrifugal force of the pawl piece 47 on the driving side and the pawl piece 58 on the driven side can be reduced and the durability can be secured.

As shown in FIG. 4 again, the wall thickness part 76 on the driving side is provided in a location in which no damper member 43 is provided by providing the wall thickness part 76 on the driving side on the side of the outer wall 55b of the first curved part 55.

Similarly, the wall thickness part 79 on the driven side is provided in a location in which no damper member 43 is provided by providing the wall thickness part 79 on the driven side on the side of the outer wall 65b of the second curved part 65.

Therefore, to avoid the wall thickness part 76 on the driving side and the wall thickness part 79 on the driven side, the damper member 43 is not required to be miniaturized.

Hereby, the rigidity of the damper member 43 can be secured to the same extent as that of a conventional type. The revolution of the output shaft 31 shown in FIG. 2 can be securely transmitted to the propeller shaft 28.

Next, referring to FIGS. 6A and 6B, the action of the coupling joint structure 30 of the small-sized boat will be described.

Figure 6A:
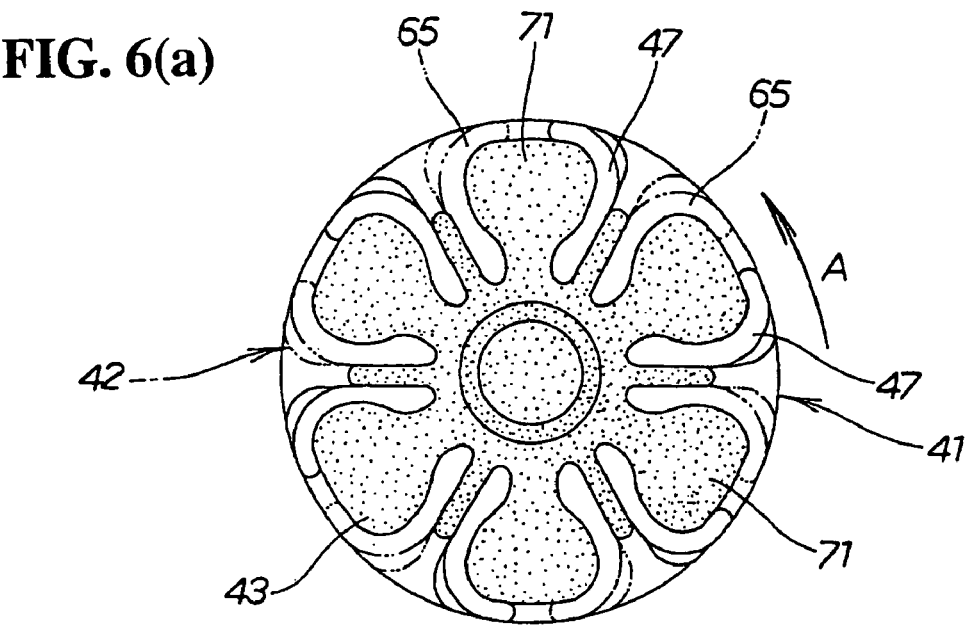
FIGS. 6A and 6B are explanatory drawings for explaining an example that the revolution of an output shaft is transmitted to a propeller shaft with the coupling joint structure of the small-sized boat according to the invention.
Figure 6B:
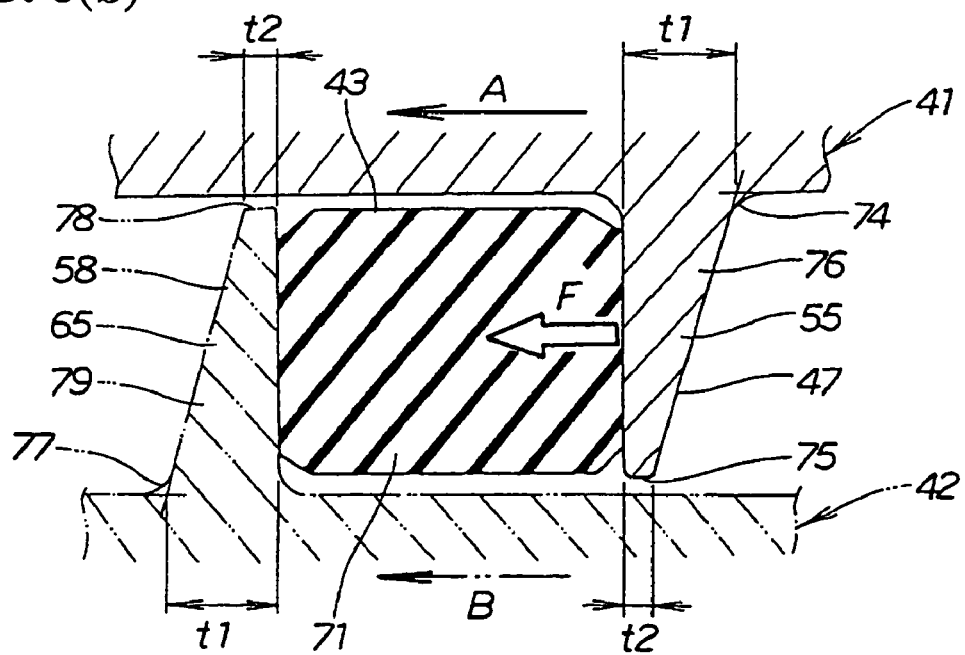
Figure 7:
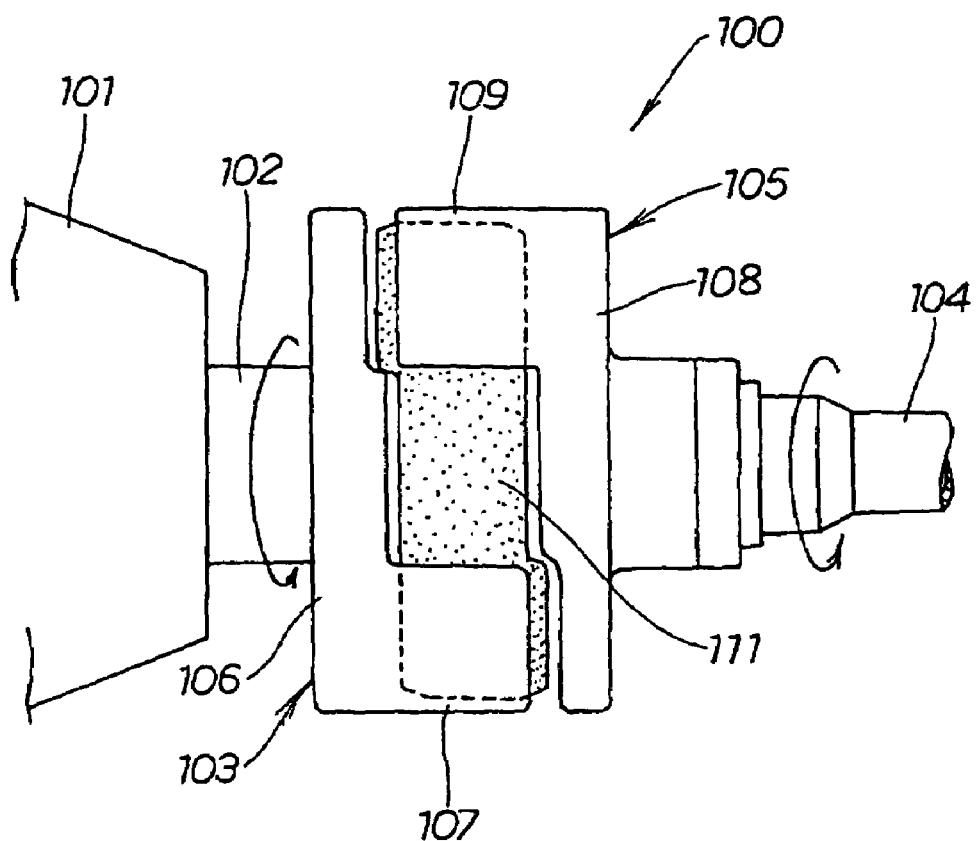
FIG. 7 is an explanatory drawing for explaining conventional type basic configuration.

FIGS. 6A and 6B are explanatory drawings for explaining an example that the revolution of the output shaft is transmitted to the propeller shaft via the coupling joint structure of the small-sized boat according to the invention.

As shown in FIG. 6A, when the output shaft 31 shown in FIG. 2 is revolved in the direction shown by the arrow, the revolution of the output shaft 31 is transmitted to the coupler 41 on the driving side.

The coupler 41 on the driving side is revolved in a direction shown by an arrow A.

As shown in FIG. 6B, when the coupler 41 on the driving side is revolved in the direction shown by the arrow A, the revolution of the coupler 41 on the driving side is transmitted to the pawl piece 47 on the driving side.

The power transmitting part 71 is pressed by the pawl piece 47 on the driving side in a direction shown by an arrow F. The revolution is transmitted to the power transmitting part 71 and the revolution transmitted to the power transmitting part 71 is transmitted to the second pawl piece 58.

When the second pawl piece 58 is revolved, the coupler 42 on the driven side is revolved in a direction shown by an arrow B. When the coupler 42 on the driven side is revolved, the propeller shaft 28 (see FIG. 2) is revolved.

The base 74 (wall thickness t1) of the pawl piece 47 on the driving side is made thicker than the end 75 (wall thickness t2).

Hereby, when the revolution of the pawl piece 47 on the driving side is transmitted to the power transmitting part 71, a load applied to the pawl piece 47 on the driving side can be securely supported by the pawl piece 47 on the driving side.

In the above-mentioned embodiment, the example that the base 74 (wall thickness t1) is made thicker by tapering the outer wall 55b of the pawl piece 47 on the driving side and the base 77 (wall thickness t1) is made thicker by tapering the outer wall 65b of the pawl piece 58 on the driven side is described, however, the invention is not limited to the example. Even if the bases 74, 77 (wall thickness t1) are thickened without tapering the outer walls 55b, 65b, the similar effect can be acquired.

The invention can be favorably applied to the coupling joint structure of the small-sized boat where the respective couplers are provided to the output shaft and the propeller shaft and the damper member is interposed between each coupler.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coupling joint structure for a power train of a boat where a revolution of an engine is transmitted to a propeller shaft by mounting the engine in the body of the boat and a propeller is provided at the back of the engine, the coupling joint structure comprising a first coupler on a driving side to an output shaft of the engine;

a second coupler on a driven side to the propeller shaft of the propeller;

extending pawl pieces on the driving side from a body of the first coupler on the driving side toward the rear of the boat;

extending pawl pieces on the driven side from a body of the second coupler on the driven side toward the front of the boat;

a damper member interposed between the pawl pieces on the driving side and the pawl pieces on the driven side, wherein the damper member is adapted to transmit the revolution of the engine to the damper member via the pawl pieces on the driving side, and to transmit the revolution of the damper member to the pawl pieces on the driven side, and wherein each of the pawl pieces on the driving side is provided with a wall thickness part on the driving side in which a wall thickness (t1) of a base is made thicker than a wall thickness (t2) of an end thereof; and wherein each of the pawl pieces on the driven side is provided with a wall thickness part on the driven side in which a wall thickness (t1) of a base is made thicker than a wall thickness (t2) of an end thereof, wherein the pawl pieces on the driving side and the driven side overlap each other in an axial direction, wherein the wall thickness parts are formed only on portions of the pawl pieces of the driving side and the driven side that do not make contact with the damper member, and wherein the wall thicknesses (t1) and (t2) of the wall thickness parts are measured in a direction that is orthogonal to an axial length of the coupling joint structure.

2. The coupling joint structure for a power train of a boat according to claim 1, wherein the wall thickness part of each of the pawl pieces on the driving side and the wall thickness part of each of the pawl pieces on the driven side are provided in locations radially outward from partitions of the damper member.

3. The coupling joint structure for a power train of a boat according to claim 1, wherein each of the pawl pieces on the driving side are provided with a radially extended first base and a first curved part curved clockwise from the outside end of the first base.

4. The coupling joint structure for a power train of a boat according to claim 3, wherein an outer wall of the first curved part of each of the pawl pieces on the driving side are tapered so that the wall thickness is gradually increased from the end thereof to the base at a forward side thereof.

5. The coupling joint structure for a power train of a boat according to claim 4, the wall thickness part of each of the pawl pieces on the driving side is provided in a location in which the damper member is not provided by providing the wall thickness part on the driving side on the side of the outer wall of the first curved part.

6. The coupling joint structure for a power train of a boat according to claim 1, wherein each of the pawl pieces on the driven side is provided with a radially extended second base and a second curved part curved counterclockwise from an outside end of the second base.

7. The coupling joint structure for a power train of a boat according to claim 6, wherein an outer wall of the second curved part of each of the pawl piece on the driven side is tapered so that the wall thickness is gradually increased from the end thereof to the base at a rear side thereof.

8. The coupling joint structure for a power train of a boat according to claim 7, wherein the wall thickness part of each of the pawl pieces on the driven side is provided in a location in which the damper member is not provided by providing the wall thickness part of the pawl on the driven side on the side of the outer wall of the second curved part thereof.

9. The coupling joint structure for a power train of a boat according to claim 1, wherein the damper member includes power transmitting parts arranged between the pawl pieces on the driving side and the pawl pieces on the driven side, and also includes partitions arranged between first bases of the pawl pieces on the driving side and second bases of the pawl pieces on the driven side.

10. The coupling joint structure for a power train of a boat according to claim 1, wherein each of the first and second couplers is provided, respectively, with an even number of pawl pieces.

11. A coupling joint structure of a boat where a revolution of an engine is transmitted to a propeller shaft by mounting the engine in the body of the boat and a propeller is provided at the back of the engine, the coupling joint structure comprising a first coupler on a driving side to an output shaft of the engine, the first coupler having first pawl pieces extending from a body of the first coupler in a direction toward a rear of the boat;

a second coupler on a driven side to the propeller shaft of the propeller, the second coupler having second pawl pieces extending from a body of the second coupler in a direction toward a front of the boat;

a damper member interposed between the first pawl pieces and the second pawl pieces, wherein the damper member is adapted to transmit the revolution of the engine to the damper member via the first pawl pieces, and to transmit the revolution of the damper member to the second pawl pieces, and wherein the pawl pieces on the driving side and the driven side overlap each other in an axial direction, wherein each of the first pawl pieces is provided with a wall thickness part in which a wall thickness (t1) of a base is made thicker than a wall thickness (t2) of an end thereof; and wherein each of the second pawl pieces is provided with a wall thickness part in which a wall thickness (t1) of a base is made thicker than a wall thickness (t2) of an end thereof;

wherein the pawl pieces on the driving side and the driven side overlap each other in an axial direction, wherein the wall thickness parts are formed only on portions of the pawl pieces of the driving side and the driven side that do not make contact with the damper member, and wherein the wall thicknesses (t1) and (t2) of the wall thickness parts are measured in a direction that is orthogonal to an axial length of the coupling joint structure.

12. The coupling joint structure of a boat according to claim 11, wherein the wall thickness part of each of the first pawl pieces and the wall thickness part of each of the second pawl pieces are provided in locations that are radially outward from partitions of the damper member.

13. The coupling joint structure of a boat according to claim 11, wherein the each of the first pawl pieces is provided with a radially extended first base and a first curved part curved clockwise from the outside end of the first base.

14. The coupling joint structure of a boat according to claim 13, wherein an outer wall of the first curved part of each of the first pawl pieces on the driving side are tapered so that the wall thickness is gradually increased from the end thereof to the base at a forward side thereof.

15. The coupling joint structure of a boat according to claim 14, the wall thickness part of each of the first pawl pieces is provided in a location in which the damper member is not provided by providing the wall thickness part on the side of the outer wall of the first curved part.

16. The coupling joint structure of a boat according to claim 11, wherein each of the second pawl pieces is provided with a radially extended second base and a second curved part curved counterclockwise from an outside end of the second base.

17. The coupling joint structure of a boat according to claim 16, wherein an outer wall of the second curved part of each of the second pawl pieces on the driven side is tapered so that the wall thickness is gradually increased from the end thereof to the base at a rear side thereof.

18. The coupling joint structure of a boat according to claim 17, wherein the wall thickness part of each of the second pawl pieces is provided in a location in which the damper member is not provided by providing the wall thickness part of the second pawl pieces on the side of the outer wall of the second curved part thereof.

19. The coupling joint structure of a boat according to claim 11, wherein the damper member includes power transmitting parts arranged between the first pawl pieces and the second pawl pieces, and also includes partitions arranged between first bases of the first pawl pieces and second bases of the second pawl pieces.

20. The coupling joint structure of a boat according to claim 11, wherein each of the first and second couplers is provided with an even number of first and second pawl pieces.

21. A coupling joint structure for a power train of a boat where a revolution of an engine is transmitted to a propeller shaft by mounting the engine in the body of the boat and a propeller is provided at the back of the engine, the coupling joint structure comprising a first coupler on a driving side to an output shaft of the engine;

a second coupler on a driven side to the propeller shaft of the propeller;

extending pawl pieces on the driving side from a body of the first coupler on the driving side toward the rear of the boat;

extending pawl pieces on the driven side from a body of the second coupler on the driven side toward the front of the boat;

a damper member interposed between the pawl pieces on the driving side and the pawl pieces on the driven side, wherein the damper member is adapted to transmit the revolution of the engine to the damper member via the pawl pieces on the driving side, and to transmit the revolution of the damper member to the pawl pieces on the driven side, wherein each of the pawl pieces on the driving side is provided with a wall thickness part on the driving side in which a wall thickness (t1) of a base is made thicker than a wall thickness (t2) of an end thereof;

wherein each of the pawl pieces on the driven side is provided with a wall thickness part on the driven side in which a wall thickness (t1) of a base is made thicker than a wall thickness (t2) of an end thereof, wherein the pawl pieces on the driving side and the driven side overlap each other in an axial direction, wherein the wall thickness parts are formed only on portions of the pawl pieces of the driving side and the driven side that do not make contact with the damper member, and when a cross section of the coupling joint structure is viewed in a front view, the wall thickness parts of the pawl pieces on the driving side are visible on surfaces of the pawl pieces facing away from the damper member.

* * * * *